US008431014B2

(12) United States Patent
Krishna et al.

(10) Patent No.: US 8,431,014 B2
(45) Date of Patent: Apr. 30, 2013

(54) PROCESS AND CATALYST SYSTEM FOR IMPROVING DEWAXING CATALYST STABILITY AND LUBRICANT OIL YIELD

(75) Inventors: Kamala R. Krishna, Danville, CA (US); James N. Ziemer, Martinez, CA (US); Andrew Rainis, Walnut Creek, CA (US); Joseph A. Biscardi, New York, NY (US); Thomas V. Harris, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 711 days.

(21) Appl. No.: 12/574,500

(22) Filed: Oct. 6, 2009

(65) Prior Publication Data

US 2011/0079540 A1   Apr. 7, 2011

(51) Int. Cl.
*C10G 65/00*   (2006.01)

(52) U.S. Cl.
USPC .................. 208/66; 208/49; 208/57; 208/58; 208/62

(58) Field of Classification Search .................. 208/49, 208/57–58, 62, 66
See application file for complete search history.

(56) References Cited

U.S. PATENT DOCUMENTS

| | | | |
|---|---|---|---|
| 3,637,878 A | 1/1972 | Hansford | |
| 3,654,132 A | 4/1972 | Christian et al. | |
| 3,702,291 A | 11/1972 | Jacquin et al. | |
| 3,703,461 A | 11/1972 | Hansford et al. | |
| 3,852,207 A | 12/1974 | Stangeland et al. | |
| 3,962,071 A | 6/1976 | Itoh et al. | |
| 4,139,493 A | 2/1979 | Mickelson | |
| 4,222,543 A | 9/1980 | Gedig et al. | |
| 4,222,855 A * | 9/1980 | Pelrine et al. | 208/111.25 |
| 4,283,271 A | 8/1981 | Garwood et al. | |
| 4,283,272 A | 8/1981 | Garwood et al. | |
| 4,325,805 A | 4/1982 | Miller | |
| 4,347,121 A | 8/1982 | Mayer et al. | |
| 4,414,097 A | 11/1983 | Chester et al. | |
| 4,601,996 A | 7/1986 | Miller | |
| 4,749,467 A | 6/1988 | Chen et al. | |
| 4,790,928 A | 12/1988 | Chang et al. | |
| 4,810,357 A | 3/1989 | Chester et al. | |
| 4,814,543 A | 3/1989 | Chen et al. | |
| 4,822,476 A | 4/1989 | Ziemer et al. | |
| 4,919,788 A | 4/1990 | Chen et al. | |
| 5,135,638 A | 8/1992 | Miller | |
| 5,246,566 A | 9/1993 | Miller | |
| 5,275,719 A | 1/1994 | Baker, Jr. et al. | |
| 5,282,958 A | 2/1994 | Santilli et al. | |
| 5,358,627 A | 10/1994 | Mears et al. | |
| 5,393,408 A | 2/1995 | Ziemer et al. | |
| 5,456,820 A | 10/1995 | Forbus, Jr. et al. | |
| 5,468,368 A * | 11/1995 | Baker et al. | 208/58 |
| 5,543,035 A | 8/1996 | Ziemer | |
| 5,885,438 A | 3/1999 | Apelian et al. | |
| 5,935,414 A | 8/1999 | Sonnemans et al. | |
| 5,951,848 A | 9/1999 | Baker, Jr. et al. | |
| 5,976,351 A | 11/1999 | Apelian et al. | |
| 5,993,644 A | 11/1999 | Xiao et al. | |
| 6,096,189 A | 8/2000 | Cody et al. | |
| 6,204,426 B1 | 3/2001 | Miller et al. | |
| 6,264,826 B1 | 7/2001 | Xiao et al. | |
| 6,475,374 B1 * | 11/2002 | Leta et al. | 208/62 |
| 6,962,651 B2 | 11/2005 | Miller et al. | |
| 6,974,535 B2 | 12/2005 | Cody et al. | |
| 7,141,529 B2 | 11/2006 | Biscardi et al. | |
| 7,250,106 B2 | 7/2007 | Benazzi et al. | |
| 7,261,805 B2 | 8/2007 | Grove et al. | |
| 7,390,394 B2 | 6/2008 | Biscardi et al. | |
| 7,390,763 B2 | 6/2008 | Zones et al. | |
| 7,468,126 B2 | 12/2008 | Zones et al. | |
| 2010/0189620 A1 * | 7/2010 | Lemon et al. | 423/327.1 |

FOREIGN PATENT DOCUMENTS

| | | |
|---|---|---|
| WO | WO9802503 A1 | 1/1998 |
| WO | WO9945085 | 9/1999 |

OTHER PUBLICATIONS

PCT International Search Report, PCT/US2011/030763, mailed Mar. 21, 2012.

\* cited by examiner

*Primary Examiner* — Brian McCaig
(74) *Attorney, Agent, or Firm* — Alan W. Klaassen; E. Joseph Gess; Terrence Flaherty

(57) ABSTRACT

The invention provides for a process for dewaxing a waxy hydrocarbon feedstock to form a lubricant oil. The invention is also directed to a catalyst system comprising a hydrotreating catalyst upstream of a dewaxing catalyst, used in the dewaxing of a waxy hydrocarbon feedstock to form a lubricant oil. In particular, the invention is directed to a process and catalyst system designed to maintain yield of lubricant oil product. Specifically, the yield of lubricant oil does not decrease more than 2%, at a target pour point, over a dewaxing temperature range. The hydrotreating catalyst helps prevent aging of the dewaxing catalyst and maintains lubricant oil product yield at a target pour point over a wide temperature range. The hydrotreating catalyst comprises platinum, palladium, or combinations thereof on a low acidity inorganic oxide support where acidity is measured by a decalin conversion of less than 10% at 700° F.

17 Claims, No Drawings

PROCESS AND CATALYST SYSTEM FOR IMPROVING DEWAXING CATALYST STABILITY AND LUBRICANT OIL YIELD

FIELD OF THE INVENTION

The invention relates to a process for reducing the wax content of wax-containing hydrocarbon feedstocks. More particularly, the invention relates to a process for converting wax-containing hydrocarbon feedstocks into high-grade products including lubricant base oils having a low pour point. This process employs a layered catalyst system comprising a hydrotreating catalyst and a dewaxing catalyst wherein the dewaxing catalyst aging is slowed and yields of base oil products are maintained over a temperature range from about 450° F. to 725° F.

BACKGROUND OF THE INVENTION

Many hydrocarbon feedstocks contain relatively high concentrations of straight chain and slightly branched chain aliphatic compounds having between 8 and 40 carbon atoms. These compounds tend to form solid waxes upon cooling of the hydrocarbon feedstock. The temperature at which the hydrocarbon oil will not flow is commonly referred to as the "pour point." The wax forming compounds are generally removed or converted through distillation or hydrotreating processes such as hydrocracking and hydroisomerization. In hydrocracking, high-molecular weight hydrocarbon components are cracked in the presence of hydrogen to lower-molecular weight components. In lubricant base oil dewaxing and/or diesel dewaxing, hydrocracking reactions reduce the waxy content of the feedstock, but can lead to a loss of yield through the production of lower molecular weight hydrocarbons such as middle distillates and even lighter C4-products. Hydroisomerization is another approach to reduce the wax content of feedstocks while minimizing the loss in yield due to the formation of highly cracked low molecular weight products. Hydroisomerization converts aliphatic, unbranched paraffinic hydrocarbons to iso-paraffins and cyclic species which do not easily form waxes.

Hydroisomerization is well known in lubricant base oil dewaxing processes. For example, U.S. Pat. No. 4,222,543 and U.S. Pat. No. 4,814,543 disclose and claim the use of constrained intermediate pore molecular sieves for lube dewaxing. U.S. Pat. No. 4,283,271 and U.S. Pat. No. 4,283,272 claim the use of these catalysts for dewaxing hydrocrackates in energy efficient configurations. Also directed to dewaxing with constrained intermediate pore molecular sieves are U.S. Pat. No. 5,135,638, U.S. Pat. No. 5,246,566 and U.S. Pat. No. 5,282,958. U.S. Pat. No. 4,347,121 claims catalytic dewaxing of hydrocrackates containing less than 10 ppm nitrogen with a hydrofinishing step upstream of the dewaxing catalyst. Important considerations in an efficient dewaxing process include the minimization of catalyst aging and the maximization of yield, particularly with respect to lubricant base oil dewaxing.

Various processes have been tried to minimize catalyst aging. For example, U.S. Pat. No. 5,456,820 discloses a process in which a lube boiling range feedstock is catalytically dewaxed in the presence of hydrogen over a catalyst comprising an intermediate pore zeolite in the decationized form. Catalyst cycle length was found to be improved by optimizing the sequencing of various solvent extracted feedstocks. Multi-layered catalyst systems have also been described as ways to minimize dewaxing catalyst aging. U.S. Pat. No. 5,951,848 and WO 98/02503 disclose the use of a two catalyst system comprising a hydrotreating catalyst and a dewaxing catalyst. The hydrotreating catalyst layer can also be referred to as a "guard bed" or "guard layer". The aging of the dewaxing catalyst is slowed due to the presence of the hydrotreating catalyst layer or guard layer which protects the dewaxing catalyst from contact with highly aromatic feedstocks which would deactivate the dewaxing catalyst. U.S. Pat. No. 4,749,467 discloses a method for extending dewaxing catalyst cycle length by employing the combination of low space velocity and a high acidity intermediate pore zeolite. The high acid activity and low space velocity reduce the start-of-cycle temperature. Because catalyst deactivation reactions are more temperature sensitive than are dewaxing reactions, low operating temperatures reduce the catalyst aging rate.

While the importance of reducing aging of the dewaxing catalyst has been known and practiced through the use of a multi-layered catalyst system or a guard bed system, as outlined above, it was surprisingly found that conventional guard bed catalyst systems led to a loss in yield of the base oil product in lubricant dewaxing due to the formation of middle distillate and low molecular weight products when the process was run at temperatures over about 600° F. Minimizing yield loss is of particular economic importance in lubricant base oil production. Thus, a lubricant oil dewaxing process in which the dewaxing catalyst is protected from aging and wherein lubricant base oil yield loss is minimized at temperatures over about 600° F. is highly desirable. Surprisingly, it was found that by tightly controlling the acidity of a hydrotreating catalyst upstream of a dewaxing catalyst, lubricant oil yield could be maintained over a wide temperature range for a target pour point.

SUMMARY

The present invention is directed to a process for catalytically dewaxing a waxy hydrocarbon feedstock to yield a lubricant oil comprising the steps of:

a) contacting a waxy hydrocarbon feedstock in a first reaction zone, under hydrotreating conditions in which the aromatics content of the feedstock is reduced, with a hydrotreating catalyst wherein the hydrotreating catalyst comprises a Group VIII metal supported on an inorganic oxide support, and wherein the hydrotreating catalyst exhibits a decalin conversion of less than 10% at 700° F., to form a first effluent and;

b) contacting at least a portion of the first effluent in a second reaction zone with a dewaxing catalyst under dewaxing conditions to yield a lubricant oil, wherein the lubricant oil has a pour point lower than the pour point of the first effluent, and wherein the yield of lubricant oil does not decrease more than 2%, at a target pour point, over a dewaxing temperature range.

In a preferred embodiment of the present process, the hydrotreating and dewaxing catalysts are in the same reactor. In another embodiment the hydrotreating catalyst and the dewaxing catalyst are in separate reactors with no treating of the fluids in between.

In an embodiment, the invention is directed to a layered catalyst system comprising:

a) a hydrotreating catalyst comprising a Group VIII metal supported on an inorganic oxide support wherein the hydrotreating catalyst exhibits a decalin conversion of less than 10% at 700° F. and;

b) a dewaxing catalyst comprising a Group VIII metal and an acidic component selected from the group consisting of zeolites, zeolite analogs, nonzeolitic molecular sieves, acidic clays, or combinations thereof;

wherein the hydrotreating catalyst and the dewaxing catalyst are in a ratio of about 1:20 to about 1:2.

In an embodiment, the dewaxing catalyst comprises a Group VIII metal which acts as a hydrogenation component and an acidic component. In an embodiment the Group VIII metal is platinum, palladium, or combinations thereof. In an embodiment the acidic component is selected from the group consisting of zeolites, zeolite analogs, nonzeolitic molecular sieves, acidic clays, and combinations thereof. Generally, the hydrotreating catalyst and a dewaxing catalyst are in a ratio of about 1:20 to about 1:2 and preferably in a ratio of about 1:20 to 1:6.

An advantage of the present system over conventional catalyst systems is the maintenance of high lubricant oil product yield over a greater temperature range. While not being bound by any theory, we believe that the minimization or elimination of acid sites in the hydrotreating catalyst maximizes lubricant oil product yield by avoiding any hydrocracking of the feedstock at elevated temperatures while effectively hydrogenating aromatic species. As the dewaxing catalyst ages, the reactor is run at higher temperatures in order to maintain a targeted pour point of the product. Typical dewaxing reactors are run at between about 550° F.-750° F. At temperatures over about 600° F., hydrocracking by a conventional hydrotreating catalyst causes lubricant oil yield reduction through unwanted hydrocracking and/or dealkylation reactions which are more favored at higher temperatures. We have found that hydrotreating catalysts, in which the decalin conversion at 700° F. is less than about 10%, upstream of a dewaxing catalyst, reduce dewaxing catalyst aging while the overall lubricant oil yield does not decrease more than 2% at a target pour point.

DETAILED DESCRIPTION

The process of the present invention involves contacting a hydrocarbon feedstock with a catalyst system comprising a hydrotreating catalyst and a dewaxing catalyst. The invention is also directed to a catalyst system comprising a hydrotreating catalyst and a dewaxing catalyst. The hydrotreating catalyst can be referred to as a "guard layer" in that it protects or guards the dewaxing catalyst from premature aging due to contact with aromatic species in the waxy hydrocarbon feedstock which can cause deactivation (i.e. aging) of the dewaxing catalyst. Preferably, the process of the present invention is practiced in a single reactor system wherein the reaction conditions are driven by the temperature required for the dewaxing catalyst to achieve a lubricant oil pour point target. As such, the actual temperature of the upstream hydrotreating catalyst will be slightly lower or equal to the temperature dictated by the dewaxing catalyst requirements. Typical dewaxing catalysts are run at operating temperatures between about 550° F. to about 750° F. Actual process conditions will depend on a variety of factors such as feed wax, feed nitrogen content, feed boiling range, LHSV, pressure of operation, dewaxing catalyst formulation and catalyst activity and age.

In testing the layered catalyst concept for certain dewaxing applications, namely production of lubricant oils from waxy feedstocks, it was found that the nature of the hydrotreating catalyst or guard layer used was key to preserving high lubricant oil yields. When using a conventional Pt/Pd catalyst on a silica-alumina base as the guard layer of the catalyst system, it was found that while the system yield was enhanced or at least preserved at operating temperatures up to 600° F., going above this temperature causal cracking of some of the lubricant oil product to diesel and kerosene, leading to yield loss of lubricant oil product. It is an object of the present invention to maintain lubricant oil yield at temperatures over about 600° F. through the use of a novel catalyst system wherein the hydrotreating catalyst upstream of the dewaxing catalyst has low acidity, thus minimizing undesired cracking of the waxy hydrocarbon feedstock. The acidity of the hydrotreating catalyst can be inferred from a measure of the decalin conversion at 700° F. The hydrotreating catalyst used in the process and the catalyst system of the invention has a decalin conversion at 700° F. of less than about 10%, preferably less than about 8%, more preferably less than about 6%, and most preferably less than about 4%.

DEFINITIONS

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The following terms will be used throughout the specification and will have the following meanings unless otherwise indicated.

As used herein, "hydrotreating" is meant any process that is carried out in the presence of hydrogen to remove or reduce impurities, including, but not limited to, hydrodesulphurization, hydrodenitrogenation, hydrodemetallation, hydrodearomatization, and hydrogenation of unsaturated compounds. Depending on the type of hydrotreating and the reaction conditions, the products of hydrotreating may show improved viscosities, viscosity indices, saturates content, low temperature properties, volatilities and depolarization, for example.

As used herein "guard bed" or "guard layer" refers to a hydrotreating catalyst or hydrotreating catalyst layer directly upstream of a dewaxing catalyst.

As used herein the term "molecular sieve" refers to a crystalline material containing pores, cavities, or interstitial spaces of a uniform size in which molecules small enough to pass through the pores, cavities, or interstitial spaces are adsorbed while larger molecules are not. Examples of molecular sieves include zeolites and non-zeolitic molecular sieves such as zeolite analogs including, but not limited to, SAPOs (silicoaluminophosphates), MeAPOs (metalloaluminophosphates), AlPO$_4$, and ELAPOs (nonmetal substituted aluminophosphate families).

"Target pour point" means the desired pour point of the lubricant base oil products. The target pour point is generally less than −10° C., preferably in the range of −10° C. to −50° C., and most preferably in the range of −10° C. to −30° C. In an embodiment, the target pour point can be −30° C. or less.

As used herein, unless otherwise specified, 100% yield of lubricant oil is taken to be the amount of lubricant oil produced without a guard layer upstream of the dewaxing layer. Changes in yields of lubricant oil are calculated by taking the amount of lubricant oil (by weight) produced at a target pour point for a given feed wherein the feed is run over the dewaxing catalyst alone under dewaxing conditions and subtracting the amount of lubricant oil (by weight) produced by running the feed under the same dewaxing conditions at the same target pour point over the catalyst system of the invention (i.e. guard layer upstream of the dewaxing layer) and dividing by the yield of lubricant oil (by weight) produced at the target pour point for the given feed wherein the feed is run over the dewaxing catalyst alone under dewaxing conditions. For example, as used herein, to calculate changes in the yield of lubricant oil the formula (A−B)/A can be used. "A" refers to the weight of lubricant oil produced at a target pour point from a given feed over a dewaxing catalyst and "B" refers to the weight of lubricant oil produced at the target pour point from said feed over a catalyst system comprising a hydrotreating catalyst upstream of the dewaxing catalyst. For example, "the yield of lubricant oil does not decrease more than 2%, at a target pour point, over a dewaxing temperature range" means that the yield of lubricant oil for a hydrotreating catalyst upstream of a dewaxing catalyst can be no less than two weight percent less than the yield of lubricant oil if the same feedstock were run over the dewaxing catalyst alone at the same temperature for the same target pour point.

As used herein, the term "large pore zeolite" refers to a zeolite with a pore aperture in the range from about 0.7 nm to about 2.0 nm in diameter. Examples of "large pore zeolites" include, but is not limited, to zeolite Y, FAU, EMT, ITQ-21, ITQ-33, and ERT.

As used herein, the term "medium pore zeolite" refers to a zeolite with a pore aperture in the range from about 0.39 nm to about 0.7 nm in diameter. Examples of medium pore zeolites include ferrierite, stilbite, SAPO-11, ZSM-5, SSZ-32, ZSM-48, and ZSM-23.

When used in this disclosure, the Periodic Table of the Elements referred to is the CAS version published by the Chemical Abstract Service in the Handbook of Chemistry and Physics, $72^{nd}$ edition (1991-1992).

"Group VIII metal" refers to elemental metals and/or metal compounds comprising a metal selected from Group VIII of the Periodic Table, CAS version published by the Chemical Abstract Service in the Handbook of Chemistry and Physics, $72^{nd}$ edition (1991-1992).

Unless otherwise specified, as used herein, feed rate to a catalytic reaction zone is reported as the volume of feed per volume of catalyst per hour. The feed rate as disclosed herein is reported in reciprocal hours (i.e. $hr^{-1}$) which is also referred to as liquid hourly space velocity (LHSV).

Feed

The present process is capable of operating with a wide variety of feedstocks. The hydrocarbon feedstocks which can be treated in accordance with the present invention include oils with generally high pour points (pour points above about 0° C.) and where it is desired to lower the pour point. In an embodiment, the hydrocarbon feedstocks can be described as waxy feeds, by waxy it is meant that the feedstock will become highly viscous, solidify, precipitate, or form solid particulates at reduced temperatures due to the presence of n-paraffins.

The feedstock preferably used in the process of the present invention generally boil in the range from 500° F. to 1300° F., and have a kinematic viscosity (measured at 100° C.) greater than about 3 cSt. Hydrocarbon feedstocks suitable for use in the process of the invention may be selected, for example, from crude oil, petroleum distillates having a normal boiling point above about 100° C., gas oils and vacuum gas oils, residuum fractions from an atmospheric pressure distillation process, solvent-deasphalted petroleum residua, shale oils, cycle oils, animal and vegetable derived fats, waxes, and oils, petroleum and slack wax, waxy petroleum feedstocks, NAO wax, and waxes produced in chemical plant processes. Straight chain n-paraffins either alone or with only slightly branched chain paraffins having 16 or more carbon atoms are sometimes referred to herein as waxes. Preferred petroleum distillates boil in the boiling point range of about 200° C. to about 700° C., more preferably in the range of about 260° C. to about 650° C. Suitable feedstocks include those heavy distillates normally defined as heavy straight-run gas oils and heavy cracked cycle oils, as well as conventional FCC fed and portions thereof. Cracked stocks may be obtained from thermal or catalytic cracking of various stocks. The feedstock may have been subjected to a hydrotreating and/or hydrocracking process before being supplied to the present process. Alternatively, or in addition, the feedstock may be treated in a solvent extraction process to reduce aromatics and sulfur- and nitrogen-containing molecules before being used in the process of the present invention.

Preferably, the hydrocarbon feedstocks which are treated in accordance with the present invention will generally have an initial pour point above about 0° C., more usually above about 20° C. In an embodiment, the feedstock has a pour point above about 50° C. The resultant hydrocarbon products after the process of the present invention is completed generally have pour points which fall below 0° C., more preferably below about −10° C., and most preferably below about −15° C.

As used herein, the term "waxy hydrocarbon feedstocks" includes petroleum waxes, plant waxes, and animal derived waxes. The feedstock employed in the process of the invention can be a waxy feed which contains greater than about 50% wax, even greater than about 70% wax. Preferably the feed contains from about 5% to about 30% wax.

Examples of additional suitable feeds for use in the process of the invention include waxy distillate stocks such as gas oils, lubricating oil stocks, synthetic oils and waxes such as those by Fischer-Tropsch synthesis, high pour point polyalphaolefins, foots oils, synthetic waxes such as alphaolefin waxes, slack waxes, deoiled waxes and microcrystalline waxes. Foots oil is prepared by separating oil from the wax. The present process is capable of operating with a wide range of feeds of mineral oil origin to produce a range of lubricant base oils with good performance characteristics. Such characteristics include low pour point, low cloud point, and high Viscosity Index. The quality of the lube base stock and the dewaxing yield are dependent on the quality of the feedstock and its amenability to processing by the catalysts of the instant invention. Feedstocks for this process are derived from the atmospheric residuum fraction of crude oil including vacuum gas oils and vacuum residues, as well as those produced by Fisher Tropsch processing of synthesis gas. Preferably, the hydrocarbon feedstock used in the process of the present invention has less than about 10 ppm nitrogen and more preferably less than about 2 ppm nitrogen. Any petroleum stream that is useful for the production of lubricating oils can be used as the hydrocarbon feedstock in the process of the present invention.

The feedstock may under go one or more pretreatment steps in order to reduce heteroatom, aromatic, asphaltene, and polycyclic naphthene content of the feed. This upgrading step can be accomplished by solvent extraction, hydroprocessing, or a combination of the two steps. Because nitrogen and sulfur act as poisons for noble metal-containing catalysts, preferred feedstocks for this invention are those which have been hydroprocessed. However, some solvent refined raffinates are also suitable for dewaxing by the catalysts of the present invention.

As stated above, the hydrocarbon feedstock may have been pretreated by hydrocracking prior to the process of this invention. Hydrocracking processes typically include reaction temperatures in the range of 250° C. to 500° C., pressures in the range of 30 to 205 bar or more, a hydrogen recycle rate of 2000 to 20000 standard cubic feet per barrel (SCF/B), and an LHSV (v/v hr) of 0.1 to 10. Hydrocracking catalysts, which are well known to the art of hydroprocessing technology, will typically contain one or more metals, or compounds thereof, selected from Group VIB and Group VIII of the Periodic Table. Hydrocracking catalysts also typically include a support material of a refractory inorganic oxide such as silica, alumina, silica-alumina, silica-alumina-zirconia, and silica-alumina-titania composites, acid treated clays and combinations thereof, and optionally may also include crystalline aluminosilicate zeolitic molecular sieves (such as Zeolite A, faujasite, Zeolite X, and Zeolite Y).

Hydrotreating Catalyst

The catalyst system of the present invention comprises a hydrotreating catalyst which acts as a guard layer and a dewaxing catalyst, preferably in the same reactor, wherein the hydrotreating catalyst is directly upstream of the dewaxing catalyst. In an embodiment, the hydrotreating catalyst and dewaxing catalyst are at the same temperature. In a further embodiment, the hydrotreating catalyst is a high activity catalyst. By "high activity" it is meant that the hydrotreating catalyst can operate effectively at high hourly liquid space velocities (LHSV above about 1.0 $hr_{-1}$) and over temperatures ranging from about 550° F. to about 750° F. In a preferred embodiment, the hydrotreating catalyst is in the same reactor as the dewaxing catalyst. When the hydrotreating catalyst and dewaxing catalyst are in the same reactor, the hydrotreating catalyst comprises from about 5% to about 30% by volume of the total catalyst in the reactor. The total catalyst volume can be described as the sum of the volume of the hydrotreating catalyst plus the volume of the dewaxing catalyst. Preferably, the hydrotreating catalyst comprises from about 10% to about 15% of the total catalyst volume. When in the same reactor as the hydrotreating catalyst, the dewaxing catalyst will make up from about 75% to about 95% of the total catalyst and preferably from about 85% to about 90% of the total catalyst volume.

The hydrotreating catalyst of the present invention comprises a Group VIII metal, preferably platinum, palladium, or combinations thereof, dispersed on a low acidity inorganic oxide support. In a preferred embodiment, the ratio of platinum to palladium is between about 5:1 to about 1:5. In another embodiment, the hydrotreating catalyst comprises a platinum-palladium alloy, wherein the molar ratio of platinum to palladium in the alloy is between about 3:1 and about 1:3 and preferably between about 2:1 and about 1:2. The amount of platinum and/or palladium metal present on the catalyst can range from 0.01 wt. % to 5 wt. %, preferably between 0.2 wt. % to 2 wt. %. The amount of platinum-palladium alloy placed on the support must be sufficient to act as an effective catalyst in the hydrogenation of the hydrocarbon feedstock. Generally, adding greater than about 1 wt. % of the alloy does not significantly improve on the activity of the catalyst and is therefore economically disadvantageous. However, amounts in excess of 1 wt. % are usually not harmful to the performance of the catalyst. Preferred hydrotreating catalysts exhibit the activity of the palladium based catalyst while maintaining the sulfur tolerance of the normally less reactive platinum based catalyst, thus providing a hydrogenation catalyst with good activity over a wide temperature range.

A number of methods are known in the art to deposit platinum and palladium metal or compounds comprising platinum and/or palladium onto the support, such as, for example, ion exchange, impregnation, and coprecipitation. In an embodiment, impregnation of the platinum and/or palladium metal is carried out under a controlled pH. In another embodiment, the impregnation solution can be buffered to maintain a pH within the range of from about 9 to about 10. In a further embodiment, the impregnation of the platinum and/or palladium metal is carried out at acidic pH (i.e. pH less than 7). In yet another embodiment the impregnation of the platinum and/or palladium metal is carried out at a basic pH (i.e. a pH greater than 7). Any pH value may be used to deposit the platinum and/or palladium metal on the support, provided that the platinum and/or palladium is dispersed on the support so as to produce a catalyst capable of hydrogenating aromatic species in the feedstock. The platinum and/or palladium metal is usually added to the impregnating solution as a metal salt, such as halide salts and/or amine complexes and/or salts of a mineral acid. Ammonium salts have been found to be particularly useful in preparing the impregnating solution. Representative of the metal salts that may be used are nitrates, carbonates, bicarbonates and carboxylic acid salts such as acetates, citrates, and formates. In the case of palladium, an ammonium nitrate salt or a chloride salt have been found to give satisfactory results. However, other salts of the platinum group metals are also operable and could be used to impregnate the support. In such case, it may be useful to determine the optimal pH to use during impregnation for the particular salt selected in order to obtain the best distribution of metals on the support.

Following impregnation, the impregnated support can be dried and/or calcined. Optionally, the impregnated support is allowed to stand before drying for a period of time sufficient for it to attain equilibration with the impregnating solution. For an extrudate, this period usually is at least 2 hours, and periods of up to 24 hours are not detrimental to the finished catalyst. A suitable standing time for a given support may be readily determined by one skilled in the art by, for example, drying at various times after impregnation and measuring the metal distribution. After optionally standing, the catalyst is dried, calcined, or dried and calcined. The prepared catalyst also can be reduced with hydrogen as is conventional in the art and placed into service.

The hydrotreating catalysts employed in the present invention comprise a catalyst support that is generally prepared from alumina, silica, silica/alumina, titania, magnesia, zirconia or combinations thereof in addition to the Group VIII metal. The catalyst support can comprise amorphous materials, crystalline materials, or combinations thereof. Examples of amorphous materials include, but are not limited to, amorphous alumina, amorphous silica, amorphous silica-alumina, and the like. In a preferred embodiment, the support is amorphous alumina. When using a combination of silica and alumina, the distribution of silica and alumina in the support may be either homogeneous or heterogeneous. A homogeneous distribution is ordinarily obtained when the silica/alumina ratio is uniform throughout the support, resulting for example from conventional coprecipitation or cogelation techniques. In some embodiments, the support consists of an alumina gel in which is dispersed the silica, silica/alumina, or alumina base material. The alumina gel is also referred to as the "oxide binder." The support may also contain refractory materials other than alumina or silica, such as for example other inorganic oxides or clay particles, provided that such material does not adversely affect the hydrogenation activity of the final catalyst or lead to deleterious cracking of the feedstock due to the presence of too many acid sites. Generally, silica and/or alumina will make up at least 90 weight percent of the entire support, and most preferably the support will be substantially all silica and/or alumina. The support can contain acidic protons which can lead to deleterious cracking reactions. Generally, alkali and/or alkaline earth cations can be used to neutralize acidic protons in the support. Sodium and potassium cations are preferably used to neutralize acidic protons. By replacing some or all of the acidic protons with non-acidic cations, the acidity of the support can be reduced.

The catalyst support can comprise crystalline materials including, but not limited to, zeolites, zeolite analogs, molecular sieves, silicoaluminophosphates, and metalloaluminophosphates. Collectively, the crystalline inorganic oxides useful in the process of the present invention are herein referred to as "molecular sieves." By "zeolite analog" it is meant that a portion of the silicon and/or aluminum atoms in the zeolite are replaced with other tetrahedrally coordinated atoms such as germanium, boron, titanium, phosphorus, gallium, zinc, iron, or mixtures thereof. The term "nonzeolitic molecular sieve" as used herein refers to molecular sieves whose frameworks are not formed of substantially only silicon and aluminum atoms in tetrahedral coordination with oxygen atoms.

Zeolites, zeolite analogs, and nonzeolitic molecular sieves can be broadly described as crystalline microporous molecular sieves that possess three-dimensional frameworks composed of tetrahedral units ($TO_{4/2}$, T=Si, Al, or other tetrahedrally coordinated atom) linked through oxygen atoms. The pores in the molecular sieve are often classified as small (8 T atoms), medium (10 T atoms), and large (12 T atoms or more), according to the number of tetrahedral atoms that surround the pore apertures. Zeolite A (LTA) and zeolite Rho are examples of molecular sieves with small pores delimited by 8-membered rings, wherein the pore aperture measures about 3-4.4 Å, ZSM-5, ZSM-11, ferrierite are examples of medium pore 10-membered rings wherein the pore aperture measures about 3.9-6.5 Å, while zeolite X, zeolite Y, and zeolite Beta are examples of zeolites with large pores delimited by 12-membered rings wherein the pore aperture measures greater than about 6.5 Å. In addition to pore aperture, molecular sieves have internal channels. The classification of intrazeolite channels as 1-, 2-, or 3-dimensional is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75).

Depending on the identity of the T atoms in the zeolite, zeolite analog, or nonzeolitic molecular sieve the properties of the material are affected. For example, the presence of aluminum in a zeolite introduces a negative charge in the zeolite framework and affects the acidity of the zeolite. The Si/Al ratio in zeolites can vary from about 1 to infinity. The lower limit arises from the avoidance of neighboring tetrahedral units with negative charges ($Al^-$—O—$Al^-$). It is generally accepted that the linking of two $AlO_4$ tetrahedra is energetically unfavorable enough to preclude such occurrences. Negative charges in a zeolite, zeolite analog, or nonzeolitic molecular sieve framework are compensated by extraframework cations such as protons and alkali cations. The presence of extraframework protons leads to acidity of the molecular sieve. The support of the hydrotreating catalyst can comprise molecular sieves as described above provided that the acid sites of the molecular sieve are neutralized with, for example, alkali or alkaline earth cations. Generally, the acidic protons in the molecular sieve can be ion exchanged with non acidic cations such as sodium or potassium cations.

The hydrotreating catalyst support can comprise layered materials such as clays (natural or synthetic). Clays can be described as phyllosilicates wherein sheets of silicon ions are tetrahedrally co-ordinated and sheets of metal ions are octahedrally and/or tetrahedrally co-ordinated by oxygen atoms. Clays can be acidic due to the incorporation of protons into the clay structure or into the interstitial space between layers. Acidic protons can be replaced by non-acidic cations such as sodium, potassium, magnesium, and the like. By replacing some or all of the acidic protons with non-acidic cations, the acidity of the clay can be reduced.

Regardless of the type of support material in the hydrotreating catalyst, the hydrotreating catalyst used in the process and catalyst system of the invention will have low acidity. By "low acidity" it is meant that there are few or no Brønsted and/or Lewis acid sites in the support or the Brønsted and/or Lewis acid sites have been neutralized by, for example, the ion exchange of acidic protons for nonacidic cations in the case of Brønsted acidity. For example, to reduce acidity, the molecular sieve, if present as the support or a component of the support in the hydrotreating catalyst, preferably contains an alkali metal and/or an alkaline earth metal. The alkali or alkaline earth metals are incorporated into the catalyst support during or after synthesis of the hydrotreating catalyst. Preferably, at least 90% of the acid sites in the catalyst support are neutralized by introduction of the nonacidic cations, more preferably at least 95%, and most preferably at least 99%.

The number and the strength of potential acid sites can be determined using any of a number of methods known to the art. For example, N. Topsøe, et al, Infrared and Temperature-Programmed Desorption Study of the Acidic Properties of ZSM-5-Type Zeolites, J. Catalysis 70, 41-52 (1981) describes infrared (IR) methods for studying acid-type catalysts. Typically, acid site density is measured using finished catalysts which have been reduced in 1 atmosphere of hydrogen at about 400° F. A useful IR method includes heating a catalyst sample, in the form of a self-supporting wafer, under vacuum (about $10^{-6}$ torr) at 500° C. to remove volatiles from the catalyst, especially water. The catalyst sample is maintained at 450° C. for 12 hours and then cooled to 150° C. The catalyst sample is then dosed with a known amount of pyridine vapor (at approximately 1 torr pressure) which had been previously dried over activated Linde 5 A molecular sieve and degassed using conventional freeze-pump-thaw techniques. An infrared spectra is taken of the sample, using, for example, a Nicolet 60SXR Fourier Transform Infrared (FT-IR) spectrometer. The areas under the 1453 $cm^{-1}$ and the 1543 $cm^{-1}$ bands give a measure of the protonic (Bronsted) acid site density and the non-protonic (Lewis) acid site density on the catalyst surface. The catalyst sample saturated with pyridine is further saturated with water vapor, and the infrared spectra scanned again. Adding water vapor will shift the ratio of Bronsted/Lewis acid site density. The peak areas of the two infrared scans provide enough detail for calculating the amount of pyridine adsorbed on the Bronsted and on the Lewis acid sites. The total acid site density is the sum of the site densities of the Lewis and Bronsted acids.

Another method of measuring the acidity of a catalyst or catalyst support is ammonia adsorption/desorption. For example, ammonia, or another nitrogen base, is adsorbed onto the catalyst. Total ammonia adsorbed can be determined by, for example, weighing the catalyst before and after ammonia adsorption. The adsorbed ammonia can then be desorbed by heating the sample stepwise and monitoring desorption by mass changes. This method can give an estimate of acid sites as well as the strength of acid sites (due to ease or difficulty in desorbing ammonia) present in the catalyst.

The techniques for determining catalyst acidity measure the number of acid sites in units of milliequivalents (meq) per gram of catalyst. As used here, "milliequivalents" refers to 1 millimole of Lewis or Bronsted acid sites. The amount of adsorbed base is related to the acid site density, and the number of acid sites on which each adsorbent molecule will adsorb. An acid site density of 1 meq/gm catalyst is equivalent to having 1 millimole of base adsorb on a gram of catalyst, when each molecule of base adsorbs on a single acid site. Preferably the hydrotreating catalyst used in the process of the present invention will contain less than 0.25 meq/g, more preferably less than 0.15 meq/g, and most preferably less than 0.1 meq/g.

Decalin conversion at 700° F. was used to determine whether a hydrotreating catalyst could be used in the process and catalyst system of the invention. "Decalin conversion" refers to the cracking of decalin to yield lower molecular weight products. We have found that hydrotreating catalysts with a decalin conversion of less than about 10% at 700° F. can be used in the process and catalyst system of the invention. Decalin conversion is an indirect measure of the acidity of the hydrotreating catalyst. Generally, lower decalin conversion indicates a lower catalyst acidity and thus less deleterious cracking of the feedstock.

The pore size distribution and pore volume of the hydrotreating catalyst can vary. The pores may be macroporous, mesoporous, or a combination thereof. As used herein, the term "macroporous" refers to a catalyst having greater than 5% of its pores as measured by mercury porosimetry of greater than about 100 nm in diameter. As used herein, the term "mesoporous" refers to a catalyst having greater than about 95% of its pores less than 100 nm in diameter as measured by mercury porosimetry. Preferably the hydrotreating catalyst comprises a support with mesopores and/or macropores and a relatively large amount of pore volume greater than about 0.1 cm$^3$/g, more preferably greater than about 0.2 cm$^3$/g, and most preferably greater than about 0.3 cm$^3$/g. Pore size distribution for the catalysts employed in the present invention is determined using mercury intrusion porosimetry as described, for example, in ASTM D4284, "Pore Volume Distribution of Catalysts by Mercury Intrusion Porosimetry."

Reaction Conditions

The hydrogenation reaction performed by the hydrotreating catalyst takes place in the presence of hydrogen, preferably at hydrogen pressures in the range of between about 500 psia and 4000 psia, more preferably in the range of about 900 psia to about 3000 psia. The feed rate to the hydrotreating catalyst, when the hydrotreating catalyst is in the same reactor as the dewaxing catalyst, is in the range of from about 3 to about 50 LHSV and preferably in the range of about 5 to about 15 LHSV. When the hydrotreating catalyst is in a separate reactor than the dewaxing catalyst the feed rate is in the range of about 0.2 to about 5.0 LHSV, preferably in the range of about 0.2 to about 2.0 LHSV. The hydrogen supply (makeup and recycle) is in the range of from about 1500 to about 10,000 standard cubic feet per barrel of lubricating oil base stock, preferably in the range of from about 2000 to about 5,000 standard cubic feet per barrel.

The hydrotreating catalyst can be run at a variety of temperatures depending on the desired product and the type of feed. In an embodiment, the hydrotreating catalyst is able to effectively hydrogenate aromatics in the feedstock to form an effluent. By effectively hydrogenate aromatics it is meant that the hydrotreating catalyst is able to decrease the aromatic content of the feedstock by at least 10%, preferably by at least 20%, and most preferably by at least 30%. In a preferred embodiment the hydrotreating catalyst is in the same reactor as the dewaxing catalyst and thus the dewaxing catalyst and hydrotreating catalyst are at the same temperature. In an embodiment, a typical temperature range for the process of the invention is between about 450° F.-750° F. In an embodiment the temperature is between about 600° F.-700° F. In a further embodiment the temperature is between about 600° F.-675° F.

Dewaxing Catalyst

Any dewaxing catalyst known in the art may be used as the dewaxing catalyst in the catalyst system of the present invention. Examples of dewaxing catalysts are given in U.S. Pat. No. 7,141,529 and U.S. Pat. No. 7,390,763, herein incorporated by reference in their entirety. Preferably, the dewaxing catalyst is a hydrodewaxing catalyst comprising a hydrogenating component and an acidic component on a support such as a porous inorganic oxide. Suitable inorganic oxide supports include silica, alumina, titania, magnesia, zirconia, silica-alumina, silica-magnesia, silica-titania and the like with alumina being preferred. The dewaxing catalyst also comprises an acidic component which may be the support itself or a molecular sieve such as a zeolite, clay, or combination thereof dispersed in the support. Examples of acidic components include an intermediate pore crystalline molecular sieve having cracking activity, such as silicalite or the aluminosilicate zeolite ZSM-5. In an embodiment, the dewaxing catalysts include one or more Group VIII and/or Group VIB metals, an alumina support, and an intermediate pore molecular sieve. Such catalysts can be produced, for example, by extruding a mixture of a 30 wt % molecular sieve dispersion in 70 wt % alumina followed by impregnation of the Group VIII and/or Group VIB metals.

Generally, the dewaxing catalyst used in the present invention comprises 1) a hydrogenation component and 2) an acidic component. Preferred hydrogenation components are Group VIII metals such as platinum and/or palladium. Preferred acidic components are medium pore molecular sieves.

The Hydrogenation Component of the Dewaxing Catalyst

The dewaxing catalyst used in the present invention comprises a hydrogenation component. Hydrogenation can be defined as a chemical reaction which results in an addition of hydrogen to organic compounds. Examples of hydrogenation reactions include the addition of hydrogen to alkenes to give alkanes, the addition of hydrogen to aromatic compounds to give cycloalkanes, and addition of hydrogen to aldehydes to give alcohols. Group VIII metals are preferred hydrogenation components in the dewaxing catalysts used in the process of the present invention.

The term "metal" or "active metal" as used herein means one or more metals in the elemental state or in some form such as sulfide, oxide and mixtures thereof. Therefore, the Group VIII metal utilized in the process of this invention can mean one or more of the metals in its elemental state or in some form such as the sulfide or oxide and mixtures thereof. Regardless of the state in which the metal component actually exists, the concentrations are computed as if they existed in the elemental state.

In one embodiment, the Group VIII metal used in the dewaxing comprises platinum, palladium, and mixtures thereof. Optionally, other catalytically active metals such as molybdenum, nickel, vanadium, cobalt, tungsten, rhodium, ruthenium, zinc, iridium, gold, silver, osmium and mixtures thereof can be included in the hydrogenation component of the dewaxing catalyst. The amount of metal ranges from about 0.01 to about 10 wt. % of the dewaxing catalyst, preferably from about 0.1 to about 5 wt. %, and more preferably from about 0.2 to about 1 wt. %. The amount of Group VIII metal used in the hydrogenating component of the dewaxing catalyst can vary, provided that there is sufficient active metal to act as a catalyst in the hydrogenation of the hydrocarbon feedstock. Generally, adding greater than about 1 wt. % of the Group VIII metal does not significantly improve on the activity of the catalyst and is therefore economically disadvantageous.

In an embodiment, the Group VIII metal is dispersed on a support. Preferably, the support is an inorganic oxide. The support may be catalytically active or inactive, provide that the support provides sufficient surface area to disperse the Group VIII metal. In addition, promoter metals can be added to the catalyst. U.S. Pat. No. 7,390,394 gives examples of inorganic oxides with catalytically active metals and promoters and is herein incorporated by reference in its entirety. A number of methods are known in the art to deposit platinum and palladium metal or compounds comprising platinum and/or palladium onto the support, such as, for example, ion exchange, impregnation, and coprecipitation.

Acidic Component of the Dewaxing Catalyst

The dewaxing catalyst further comprises an acidic component. The acidic component is selected from the group consisting of molecular sieves, amorphous inorganic oxides, and clays. Preferably the acid component is a medium pore molecular sieve such as a medium pore zeolite, silicoaluminophosphate, or borosilicate. More preferably the acid component is a one-dimensional (1-D) medium pore molecular sieve, wherein "one-dimensional" is defined herein as a system of non-intersecting parallel one-dimensional channels. The classification of intrazeolite channels as 1-, 2-, or 3-dimensional is set forth by R. M. Barrer in Zeolites, Science and Technology, edited by F. R. Rodrigues, L. D. Rollman and C. Naccache, NATO ASI Series, 1984 which classification is incorporated in its entirety by reference (see particularly page 75). Examples of 1-D zeolites include cancrinite hydrate, laumontite, mazzite; mordenite and zeolite L.

Preferably, the pores of the medium pore molecular sieve are oval in shape, by which is meant the pores exhibit two unequal axes referred to herein as a minor axis and a major axis. The term oval as used herein is not meant to require a specific oval or elliptical shape but rather to refer to the pores exhibiting two unequal axes. The 1-D pores of the catalysts useful in the practice of the present invention can have a minor axis between about 3.9 Å and about 4.8 Å. and a major axis between about 5.4 Å. and about 7.1 Å as determined by conventional X-ray crystallography measurements.

An example of a medium pore size molecular sieve for use in the process of the invention is the silicoaluminophosphate SAPO-11. SAPO-11 comprises a molecular framework of corner-sharing [SiO$_2$] tetrahedra, [AlO$_2$] tetrahedra and [PO$_2$] tetrahedra, [i.e., (S$_x$Al$_y$P$_z$)O$_2$ tetrahedral units]. When combined with a Group VIII metal hydrogenation component, the SAPO-11 converts the waxy components of the waxy feedstock to produce a lubricating oil having excellent yield, very low pour point, low viscosity and high viscosity index. SAPO-11 is disclosed in detail in U.S. Pat. No. 5,135,638, which is hereby incorporated by reference for all purposes.

Other medium pore size silicoaluminophosphate molecular sieves useful in the process of the invention are SAPO-31 and SAPO-41, which are also disclosed in detail in U.S. Pat. No. 5,135,638.

Further examples of molecular sieves which are useful in the process of the present invention include the zeolites ZSM-12, ZSM-21, ZSM-22, ZSM-23, ZSM-35, ZSM-38, ZSM-48, ZSM-57, SSZ-32, ferrierite and L and other molecular sieve materials based upon aluminum phosphates such as SM-3, SAPO-11, SAPO-31, SAPO-41, MAPO-11 and MAPO-31. The medium pore size molecular sieve is preferably SAPO-11, SM-3, SSZ-32, ZSM 22, or ZSM 23. Medium pore size molecular sieve catalysts are taught in U.S. Pat. No. 5,282,958, U.S. Pat. No. 7,468,126, U.S. Pat. No. 6,204,426, and WO 99/45085, herein incorporated by reference.

In addition to crystalline materials, the dewaxing catalyst can comprise amorphous inorganic oxides, such as silica, alumina, titania, zirconia, magnesia, or combinations thereof. The inorganic oxide is porous, preferably mesoporous and can contributed to the dewaxing activity of the catalyst by providing acidic sites. In some embodiments the amorphous inorganic oxide can be non-reactive in that it acts only as a support for the hydrogenation component and acidic component of the dewaxing catalyst but does not impart any catalytic activity itself. Consistent with the requirements of a lube hydroprocessing catalyst, the support should have a pore size and distribution which is adequate to permit the relatively bulky components of the high boiling feeds to enter the interior pore structure of the catalyst where the desired hydroprocessing reactions occur. To this extent, the catalyst will normally have a minimum pore size of about 40 Å, i.e., with no less than about 5% of the pores having a pore size less than 40 Å pore size, with the majority of the pores having a pore size in the range of 40-400 Å, preferably with no more than about 30% having pore sizes in the range of 200-400 Å. Preferred catalysts for the first stage have at least 60% of the pores in the 40-200 Å range. In an embodiment, the inorganic oxide can contribute acidic sites to the dewaxing catalyst to enhance the activity of the dewaxing catalyst. In another embodiment, the inorganic oxide can act as a non-reactive support for the hydrogenation component (i.e. a noble metal such as platinum) and the acidic component (i.e. an acidic zeolite). The inorganic oxide can be in the form of a cogel. In an embodiment, the dewaxing catalyst comprises alumina, a noble metal, and a zeolite. In another embodiment, the dewaxing catalyst comprises from 15 wt. % to 85 wt. % zeolite composited with an alumina or silica inorganic oxide binder. Generally, binders such as alumina can be added during the preparation of the dewaxing catalyst. The binder can comprise from 0 wt. % to 95 wt. % of the dewaxing catalyst, preferably from 15 wt. % to 85 wt. %.

The techniques of introducing catalytically active metals into a molecular sieve are known, and preexisting metal incorporation techniques and treatment of molecular sieves to form an active catalyst such as ion exchange, impregnation or occlusion during sieve preparation are suitable for use in the present invention.

Dewaxing Conditions

In the process of the invention, at least a portion of the effluent from the reaction of the waxy feedstock with the hydrotreating catalyst is contacted with hydrogen over a second catalyst comprising a dewaxing catalyst. The dewaxing conditions employed depend on the feedstock used and the desired balance of pour point, viscosity index, and yield in the lubricant oil product. Generally, the dewaxing catalyst reaction takes place in the presence of hydrogen, preferably at hydrogen pressures in the range of between about 500 psia and 4000 psia, more preferably in the range of about 900 psia to about 3000 psia. The feed rate to the dewaxing catalyst is in the range of from about 0.2 to about 5.0 LHSV, preferably in the range of about 0.5 to about 2.5 LHSV. The hydrogen supply makeup is in the range of from about 100 to about 15,000 standard cubic feet per barrel of lubricating oil base stock, preferably in the range of from about 250 to about 1,500 standard cubic feet per barrel. The hydrogen recycle is in the range of from about 250 to about 10,000 standard cubic feet per barrel of lubricating oil base stock, preferably in the range of from about 2500 to about 5,000 standard cubic feet per barrel. The temperature can range from about 450° F. to about 750° F., preferably from about 550° F. to about 725° F., and most preferably from about 600° F. to about 675° F.

Products

In an embodiment, the process of the invention produces a lubricant oil. The lubricant oil has a pour point less than about 0° C., preferably less than about −5° C., and most preferably less than about −10° C. as measured by ASTM D-97. In an embodiment, the lubricant oil product has a pour point in the range of −10° C. to −45° C. The lubricant oil product can be further hydrotreated over one or more hydrotreating catalysts including hydrofinishing catalysts to achieve the desired final lubricant oil product characteristics. For example, a portion, or all, of the lubricant oil product from the dewaxing catalyst reaction zone can be mildly hydrotreated or hydrofinished to remove colored materials or hydrogenate aromatic species in order to meet the desired lubricant oil specifications. Generally, the final lubricant oil product will be a lubricant oil with an initial boiling point in the range of 600 to 1000° F. and an end boiling point in the range of 750 to greater than 1300° F. The lubricant oil products generally have viscosities in the range of 3 to 30 cSt at 100° C. and viscosity indexes in the range of 95 to 170 as measured by ASTM D445.

The following examples are illustrative and not intended to limit the scope of the invention which is defined by the appended claims.

EXAMPLES

Example 1

Catalyst A was made using an alumina base having a surface area of 150 m$^2$/g as calculated by nitrogen adsorption/desorption, an Hg intrusion volume of 0.84 cc/g, and a macropore volume of 0.075 cc/g. 20 grams (volatiles free basis) of alumina base was impregnated by incipient wetness with a solution of 0.16 grams of chloroplatinic acid and 0.2 grams of palladium dichloride in 18 ml of 1% HCL in deionized water to form a reaction mixture. The reaction mixture was allowed to soak for 24 hours before being dried at 150° C. for 1 hour followed by calcination at 300° C. for an additional hour to form the finished hydrotreating catalyst. The finished hydrotreating catalyst had a Pt and Pd content of 0.3 wt. % and 0.6 wt. %, respectively.

Example 2

Catalyst B was made from a mixture of 80% pseudoboehmite alumina (Versal 250 alumina, UOP), 10% boehmite alumina (Catapal B, Sasol), and 10% milled calcined alumina fines (smaller than 325 Tyler mesh). The alumina powders were dry mixed for 10 minutes in a Baker-Perkins mixer before being sprayed with a solution containing 4% nitric acid to a volatiles target of 62% to form a wet dough. The wet dough was mixed for a total of 30 minutes before transferring to a Loomis RAM extruder and pressed through 1/16" die inserts to form an extrudate. The extrudate was dried at 130° C. for 30 minutes with high air flow and calcined at 680° C. in air for 1 hour to form a calcined alumina base. The resulting calcined alumina base had a surface area of 260 m$^2$/g as calculated by nitrogen adsorption/desorption, an Hg intrusion volume of 0.62 cc/g and a macropore volume of 0.001 cc/g. The calcined alumina base was then impregnated with Pt and Pd using the same procedure outlined in Example 1. The finished catalyst had a Pt and Pd content of 0.3 wt. % and 0.6 wt. %, respectively.

Example 3

Catalyst C was made using an alumina base having a surface area of 192 m$^2$/g, as calculated by nitrogen adsorption/desorption, an Hg intrusion volume of 0.75 cc/g, and a macropore volume of 0.01 cc/g. Ninety nine grams (volatiles free basis) of the alumina base was impregnated by incipient wetness with a 9.7 pH adjusted aqueous solution of 3.1% Pt as the tetraamine dinitrate salt to form a reaction mixture. The reaction mixture was allowed to soak for 24 hours before being dried at 150° C. for 1 hour followed by calcination at 370° C. for an additional hour to form a finished catalyst. The finished catalyst had a Pt content of 1 wt. %.

Example 4

Catalyst D was made from a mixture of 75% pseudoboehmite alumina (Versal 250 alumina, UOP), 5% boehmite alumina (Catapal B, Sasol), and 20% milled calcined alumina fines (smaller than 325 Tyler mesh). The alumina powders were dry mixed for 10 minutes in a small Littleford mixer before being sprayed with a solution containing 1.7% nitric acid to a volatiles target of 60% to form a wet dough. The wet dough was mixed for total of 10 minutes before being back neutralized with a solution of 15% NH$_4$OH to a final volatiles target of 61% and mixed for an additional 10 minutes. The resulting wet mix was transferred to a Bonnot extruder equipped with a 2" auger and extruded through 1/16" die inserts to form an extrudate. The extrudate was dried at 130° C. for 30 minutes with high air flow and calcined at 815° C. in air for 1 hour to form an alumina base. The alumina base had a surface area of 185 m$^2$/g, as calculated by nitrogen adsorption/desorption, an Hg intrusion volume of 0.84 cc/g, and a macropore volume of 0.05 cc/g. Ten grams (volatiles free basis) of base was impregnated by incipient wetness with a solution of 0.03 grams of platinum (as the tetraamine dinitrate salt) and 0.06 grams of palladium (as the tetraamine dinitrate salt) in 8.5 ml of deionized water adjusted to a pH of 9.0 to form a reaction mixture. The reaction mixture was allowed to soak for 24 hours before being dried at 150° C. for 1 hour followed by calcination at 300° C. for an additional hour to from the finished hydrotreating catalyst. The finished hydrotreating catalyst had a Pt and Pd content of 0.3 wt. % and 0.6 wt. %, respectively.

Example 5

Catalyst E was made using the same calcined alumina base described in Example 4. Ten grams (volatiles free basis) of calcined alumina base was impregnated by incipient wetness with a solution of 0.03 grams of platinum (as the tetraamine dinitrate salt) and 0.06 grams of palladium (as the tetraamine dinitrate salt) in 8.5 ml of deionized water adjusted to a pH of 1.0 by the addition of dilute nitric acid, to form a reaction mixture. The reaction mixture was allowed to soak for 24 hours before being dried at 150° C. for 1 hour followed by calcination at 300° C. for an additional hour to from the finished hydrotreating catalyst. The finished hydrotreating catalyst had a Pt and Pd content of 0.3 wt. % and 0.6 wt. %, respectively.

Example 6

Catalyst F was made from a silica alumina base using a recipe previously described in Example 2 of U.S. Pat. No. 5,393,408, herein incorporated by reference. The silica alumina base had a surface area of 415 m$^2$/g, as calculated by nitrogen adsorption/desorption, a Hg intrusion volume of 0.74 cc/g, and a macropore volume of 0.03 cc/g. Fifty grams (volatiles free basis) of the silica alumina base was impregnated by incipient wetness with a solution of 0.15 grams of platinum (as the tetraamine dinitrate salt) and 0.3 grams of palladium (as the tetraamine dinitrate salt) in 45 ml of deionized water adjusted to a pH of 9.0 to form a reaction mixture. The reaction mixture was allowed to soak for 24 hours before being dried at 150° C. for 1 hour followed by calcination at 400° C. for an additional hour to form a finished hydrotreating catalyst. The finished hydrotreating catalyst had a Pt and Pd content of 0.3 wt. % and 0.6 wt. %, respectively.

Example 7

Catalyst G was made from the same silica alumina base described in Example 6, and impregnated with platinum and palladium using the same procedure as described in Example 6 with the exception that the platinum and palladium content was 0.2 wt. % and 0.16 wt. %, respectively.

Example 8

Catalyst H was made from a mixture of 82% silica-alumina with an alumina to silica ratio of 70:30 (Siral 30, Sasol), 14% boehmite alumina (Catapal B, Sasol), and 4% milled calcined silica-alumina fines (less than 350 mesh). The alumina and silica-alumina powders were dry mixed for 20 minutes in a small Baker-Perkins mixer before being sprayed with a solution containing 4% nitric acid to a volatiles target of 62% to from a wet dough. The wet dough was mixed for a total of 30 minutes before transferring to a Loomis RAM extruder and pressed through 1/16" die inserts to from an extrudate. The extrudate was dried for 130° C. for 30 minutes with high air flow and calcined at 680° C. in air for 1 hour to form a silica-alumina base. The resulting silica-alumina base had a surface area of 400 $m^2$/g, as calculated by nitrogen adsorption/desorption, an Hg intrusion volume of 0.74 cc/g and a macropore volume of 0.03 cc/g. Ten grams (volatiles free basis) of silica-alumina base was impregnated by incipient wetness with a solution of 0.03 grams of platinum (as the tetraamine dinitrate salt) and 0.06 grams of palladium (as the tetraamine dinitrate salt) in 8.5 ml of deionized water adjusted to a pH of 9.0 to from a reaction mixture. The reaction mixture was allowed to soak for 24 hours before being dried at 150° C. for 1 hour followed by calcination at 300° C. for an additional hour to form the finished hydrotreating catalyst. The finished hydrotreating catalyst had a platinum and palladium content of 0.3 wt. % and 0.6 wt. %, respectively.

Example 9

Catalyst J was made from the same silica-alumina base as described in Example 6, and impregnated with platinum and palladium using the same procedure as described in Example 6 with the exception that 16.4 grams of $MgNO_3 \cdot 2H_2O$ (magnesium nitrate dehydrate) was added to the impregnation solution to suppress silica-alumina base acidity. The finished catalyst had a platinum and palladium content of 0.3 wt. % and 0.6 wt. %, respectively, and a magnesium content of 3 wt. %.

Example 10

Catalyst K was made from the same silica-alumina base as described in Example 6, and impregnated with Pt and Pd using the same procedure as described in example 6 with the exception that 24.6 grams of $MgNO_3 \cdot 2H_2O$ (magnesium nitrate dehydrate) was added to the impregnation solution to suppress silica-alumina base acidity. The finished catalyst had a platinum and palladium content of 0.3 wt. % and 0.6 wt. %, respectively, and a magnesium content of 4.5 wt. %.

Example 11

Catalyst L was made from the same silica-alumina base as described in Example 6, and impregnated with Pt and Pd using the same procedure as described in Example 6 with the exception that 5.6 grams of $Na_2NO_3$ (sodium nitrate) was added to the impregnation solution to suppress silica-alumina base acidity. The finished catalyst had a platinum and palladium content of 0.3 wt. % and 0.6 wt. %, respectively, and a sodium content of 3 wt. %.

Example 12

Catalyst M was made from the same silica-alumina base as described in Example 6, and impregnated with platinum and palladium using the same procedure as described in Example 6 with the exception that 11.3 grams of $Na_2NO_3$ (sodium nitrate was added to the solution to suppress silica-alumina base acidity. The finished catalyst had a platinum and palladium content of 0.3 wt. % and 0.6 wt. %, respectively, and a sodium content of 6 wt. %.

Hydrocracking Activity of Hydrotreating Catalysts A-M

Hydrotreating catalysts A-M were tested for use in the layered catalyst system of the invention. The hydrotreating catalysts with a cracking activity, as measured by decalin conversion, of less than 10% at 700° F. can be used in the process and catalyst system of the invention. The cracking activity of the hydrotreating catalysts was evaluated using a model feed mixture composed of 42% cis and 58% trans decahydronaphthalene a.k.a. decalin (C-10). The exact ratio of cis and trans decalin in the feed mix is not expected to be critical as long as the respective components do not differ by more than +/−5% from this composition.

Decalin Conversion

For all catalyst screening tests, the WHSV, gas rate, and unit pressure was held constant. Analysis of the feed and product hydrocarbon distributions was conducted using online GC analysis. For all catalytic testing, the catalysts were reduced and dried out in flowing $H_2$ and then pre-treated with an amine solution prior to introducing the decalin model compound feed.

The protocol for catalyst testing was as follows:
1) 0.5 grams of crushed 24-48 mesh catalyst was charged to the reactor, typically centered in a 1/4" stainless steel tube with the remaining dead space filled with 48-80 mesh inert alundum.
2) $H_2$ flow was adjusted to 160 mls/minute at ambient pressure.
3) The reactor temperature was ramped to 750° F. and held for one hour.
4) The reactor was cooled to 500° F.
5) The reactor was pressurized to 2000 psig and the $H_2$ flow once more adjusted to ensure 160 ml/min (ambient pressure basis).
6) The catalyst was titrated with a solution of 500 ppm t-butylamine (Aldrich 98%) in n-heptane (Aldrich 99%) for 18 hours at a rate of 0.025 ml/min (2.05 WHSV).
7) The titration feed was stopped and a decalin feed (Aldrich 99%) spiked with 5 ppm t-butylamine (Aldrich 98%) was pumped to the reactor at a rate of 0.01 ml/min (1.08 WHSV).
8) After 4 hours stabilization, the decalin conversion was evaluated at 500° F. by sampling the product stream using online GC. Since little or no conversion of decalin to cracked product occurs at this temperature, the data point was used to establish the GC baseline for unreacted decalin.

9) The reactor temperature was then increased to 700° F. and allowed to stabilize for 1 hour before final decalin conversion analysis was repeated. Typically 2-4 data points were taken and averaged during the 500° F. and 700° F. temperature points.

| Summary of test conditions for decalin conversion: | |
|---|---|
| Catalyst amount | 0.5 g |
| $H_2$ flow rate | 160 ml/min |
| Titration feed liquid flow rate | 0.025 ml/min (2.05 WHSV) |
| Decalin feed liquid flow rate | 0.01 ml/min (1.08 WHSV) |
| System Total Pressure | 2000 psig |

It should be noted that smaller or larger amounts of catalyst can be tested using this method as long as the hydrogen gas flow and liquid flow rate are scaled proportionally.

Data Analysis

The catalysts residual cracking activity was based on the conversion of cis+trans decalin to cracked products at 700° F. relative to 500° F. (where no conversion to light products is expected). The ring opening conversion of decalin to other $C_{10}$ isomers are grouped together as non-cracked products on a weight percent basis. Hence, the Iso Decalin group will be defined as those products with molecular weights greater than nC9 and including trans decalin. No discrimination is made regarding the relative distribution of different light cracked products.

Using the FID analysis, area percent of the desired peaks and groups were calculated assuming a response factor of 1 for all of the hydrocarbons.

% Cracking Conversion=(1−[(total $C_{10}$ remaining at 700° F.)/(total $C_{10}$ remaining at 500° F.)])*100

Hydrotreating Catalyst Test Results

The hydrotreating catalysts A-M described in Examples 1 through 12 were all evaluated for cracking activity using the decalin conversion test outlined above. These results are summarized below:

TABLE 1

| Catalyst ID | Decalin % Conversion at 700° F. |
|---|---|
| A | 1.9% |
| B | 2.3% |
| C | 4.8% |
| D | 2.7% |
| E | 3.8% |
| F | 61.3% |
| G | 65.5% |
| H | 34.4% |
| J | 6.5% |
| K | 3.3% |
| L | 0% |
| M | 0% |

Hydrotreating catalysts A, B, C, D, J, K, L, and M with a decalin conversion of less than 10% are used in catalyst systems of the invention and in the process of the invention. The hydrotreating catalysts A, B, C, D, J, K, L, and M with a decalin conversion of less than 10% maintain lubricant oil product yield at a target pour point within 2% over a dewaxing temperature range when used in the layered catalyst system of the invention. The hydrotreating catalysts A, B, C, D, J, K, L, and M with a decalin conversion of less than 10% maintain lubricant oil product yield at a target pour point over a dewaxing temperature range when used in the process of the invention. Conventional hydrotreating catalysts F, G, and H with a decalin conversion of greater than 10% cannot be used in the catalyst systems of the invention nor in the process of the invention. Catalysts F, G, and H result in a yield loss of lubricant oil greater than 2% at a target pour point over a dewaxing temperature range.

Lubricant Oil Production at a Target Pour Point

Example 13

A waxy hydrocrackate with an API of 32.5, with 10% wax content and a viscosity at 100 C of 5.4 cst was dewaxed over a hydrotreating reaction zone, a dewaxing reaction zone, and a hydrofinishing reaction zone. The hydrotreating catalyst in the hydrotreating reaction zone was 0.64 wt. % Pt on a nonacidic, potassium neutralized, L-zeolite support with an expected decalin conversion of less than 10%. The dewaxing catalyst in the dewaxing reaction zone was 0.325 wt. % Pt on a bound zeolitic catalyst containing 65% SSZ-32 on alumina. The hydrofinishing catalyst in the hydrofinishing reaction zone, was 0.2% Pt, 0.16% Pd bound on Siral 40 and alumina. The process conditions used were 1.0 LHSV, 4000 scf/bbl gas to oil ratio and 2300 psig total pressure and the target pour point was −15° C. The reaction temperature was 450° F. for the hydrotreating reaction zone, 600-650° F. for the dewaxing reaction zone (adjusted to achieve a target pour point of −15° C.), and 450° F. for the hydrofinishing reaction zone. The yield of lubricant oil was 91%.

Example 14

A waxy hydrocrackate with an API of 32.5, with 10% wax content and a viscosity at 100 C of 5.4 cst was dewaxed over a first reaction zone, a second reaction zone, and a third reaction zone. The hydrotreating catalyst in the first reaction zone was 0.64 wt. % Pt on a nonacidic, potassium neutralized, L-zeolite support with an expected decalin conversion of less than 10%. The dewaxing catalyst in the second reaction zone was 0.325 wt. % Pt on a bound zeolitic catalyst containing 65% SSZ-32 on alumina. The hydrofinishing catalyst in the third reaction zone, was 0.2% Pt, 0.16% Pd bound on Siral 40 and alumina. The process conditions used were 1.0 LHSV, 4000 scf/bbl gas to oil ratio and 2300 psig total pressure and the target pour point was −15° C. The reaction temperature was 650° F. for the hydrotreating reaction zone, 600-650° F. for the dewaxing reaction zone (adjusted to achieve a target pour point of −15° C.), and 450° F. for the hydrofinishing reaction zone. The yield of lubricant oil was 90.5%.

Example 15 (Comparative)

Example 15 was run under the same conditions as Example 13 without the hydrotreating reaction zone. Lubricant oil yield was 89%.

Results and reaction conditions for Examples 13-15 are summarized in Table 2, below.

TABLE 2

| | Example 13 | Example 14 | No guard layer (Example 15 Comparative) |
|---|---|---|---|
| LHSV | 1 | 1 | 1 |
| Pressure (psig) | 2300 | 2300 | 2300 |

TABLE 2-continued

|  | Example 13 | Example 14 | No guard layer (Example 15 Comparative) |
|---|---|---|---|
| Temperature (° F.) (hydrotreating zone/dewaxing zone/hydro-finishing zone) | 450/600/450 | 650/600/450 | NA/600/450 |
| Target pour point | −15° C. | −15° C. | −15° C. |
| Wax Content Feed (%) | 10 | 10 | 10 |
| Lube Yield (%) | 91 | 90.5 | 89 |

The Examples 13-14 above illustrate the maintenance in lubricant oil yield at a target pour point within about 2% at dewaxing temperatures (450° F. and 650° F.) when using the process of the invention. Example 15 shows the yield of lubricant oil without the hydrotreating layer.

Example 16

A waxy hydrocrackate with an API of 30.6, with 12% wax content and a viscosity at 100° C. of 6.15 cst was dewaxed over a first reaction zone, a second reaction zone, and a third reaction zone. The hydrotreating catalyst in the first reaction zone was Catalyst G with a decalin conversion of 65%. The dewaxing catalyst in the second reaction zone was 0.325 wt. % Pt on a bound zeolitic catalyst containing 65% SSZ-32 on alumina. The hydrofinishing catalyst in the third reaction zone, was also Catalyst G. The process conditions were 1.6 LHSV based on the dewaxing reaction zone, 4000 scf/bbl gas to oil ratio and 2300 psig total pressure; LHSV for the first zone was 10 hr$^{-1}$. The product target pour point was −15° C. which required the dewaxing zone to be maintained at 645° F.-655° F. The reaction temperature for the hydrotreating reaction zone was varied from 250° F. to 700° F.; and the hydrofinishing reaction zone was maintained at 450° F. The temperatures of reaction zone one were varied from 650° F.-700° F. to assess the impact of temperature on the lubricant oil yield. The yield of lubricant oil was 94±1% for the temperature range from 170° F.-600° F. of the first reaction zone. The yield dropped by 2% to 92% when the first reaction zone was maintained at 650° F. The drop in yield was approximately 4% at 665° F., and even larger at temperatures of 680° F. and 700° F. When the first reaction zone was bypassed, the lubricant oil yield was 93.5%. Results are summarized in Table 3.

TABLE 3

| | | | | | | | | | | |
|---|---|---|---|---|---|---|---|---|---|---|
| LHSV over dewaxer (reaction zone 2) | 1.6 | 1.6 | 1.6 | 1.6 | 1.6 | 1.6 | 1.6 | 1.6 | 1.6 | 1.6 |
| Hydrotreating zone, ° F. | NA | 250 | 450 | 550 | 600 | 650 | 665 | 680 | 700 | NA |
| Dewaxing zone, ° F. | 645 | 645 | 645 | 650 | 650 | 655 | 655 | 655 | 655 | 655 |
| Hydrofinishing zone, ° F. | 450 | 450 | 450 | 450 | 450 | 450 | 450 | 450 | 450 | 450 |
| Product Yield | 93.5 | 94 | 93.5 | 94 | 93.9 | 92 | 89.9 | 84 | 76.3 | 93.5 |
| Product pour point, ° C. | −15 | −12 | −14 | −15 | −14 | −14 | −17 | −17 | −14 | −16 |
| Product VI | 102 | 102 | 102 | 102 | 102 | 103 | 103 | 105 | 108 | 102 |

Example 17

A waxy hydrocrackate with an API of 38.9, with 33% wax content and a viscosity at 100° C. of 4.1 cst was dewaxed over a first reaction zone, a second reaction zone, and a third reaction zone. The hydrotreating catalyst in the first reaction zone was a catalyst with 0.5 wt. % Pt and 0.5 wt. % Li impregnated on an alumina support with an expected decalin conversion of <10%. The dewaxing catalyst in the second reaction zone was a 1.24 wt. % Ca ion-exchanged on a HSSZ-32 zeolite powder, which was then impregnated with 0.5 wt. % Pt. The hydrofinishing catalyst in the third reaction zone, was Catalyst G. The process conditions were 0.85 Hr$^{-1}$ LHSV based on the dewaxing reaction zone, 4000 scf/bbl gas to oil ratio and 2300 psig total pressure; LHSV for the first zone was also 0.85. The product target pour point was −15° C. which required the dewaxing zone to be maintained at 595° F. to 608° F. The reaction temperature is for the hydrotreating reaction zone was varied from 450° F. to 650° F.; and the hydrofinishing reaction zone was maintained at 450° F. The yield of lubricant oil was 74%±0.5. When the first reaction zone was bypassed, the lube yield from the second and third reaction zones was 75%. Results are summarized in Table 4.

TABLE 4

|  | Example 17 | Example 17 | Example 17 | No guard layer (Ex. 17 Comparative) |
|---|---|---|---|---|
| LHSV | 0.85 | 0.85 | 0.85 | 0.85 |
| Pressure (psig) | 2300 | 2300 | 2300 | 2300 |
| Temperature (° F.) (hydrotreating zone/dewaxing zone/hydro-finishing zone) | 450/608/450 | 550/608/450 | 650/608/450 | NA/595/450 |
| Pour point, ° C. | −16° | −15 | −15° | −15° |
| Wax Content Feed (%) | 33 | 33 | 33 | 33 |
| Lube Yield (%) | 74 | 74.5 | 75.5 | 75.3 |

Example 18

A waxy hydrocrackate with an API of 38.9, with 33% wax content and a viscosity at 100° C. of 4.1 cst was dewaxed over a first reaction zone, a second reaction zone, and a third reaction zone. The hydrotreating catalyst in the first reaction zone was Catalyst G with a decalin conversion of 65%. The dewaxing catalyst in the second reaction zone was a 1.24 wt. % Ca ion-exchanged on a zeolitic support of SSZ-32 zeolite, which was then impregnated with 0.5 wt % Pt. The hydrofinishing catalyst in the third reaction zone was Catalyst G. The process conditions were 0.85 LHSV, 4000 scf/bbl gas to oil ratio and 2300 psig total pressure. The product target pour point was approximately −40° C. which required the dewaxing zone to be maintained at 610° F.-630° F. The reaction temperature for the hydrotreating reaction zone was 650° F.; and the hydrofinishing reaction zone was maintained at 450° F. The yield of lubricant oil is shown in Table 5 below. When compared with a system lacking a hydrotreating layer, but run under similar conditions, the lubricant oil yield was approximately 18% greater for the system without the hydrotreating layer.

TABLE 5

|  | Example 18 | No guard layer (Comparative) |
|---|---|---|
| LHSV | 0.85 | 0.85 |
| Pressure (psig) | 2300 | 2300 |
| Temperature (° F.) (hydrotreating zone/dewaxing zone/hydrofinishing zone) | 650/610/450 | NA/630/450 |
| Pour point, ° C. | −44° | −42 |
| Wax Content Feed (%) | 33 | 33 |
| Lube Yield (%) | 42 | 60 |

The Examples 16 and 18 above illustrates the loss of lubricant oil yield (>2%) at a target pour point at dewaxing temperatures (650° F. and above) when using a catalyst exhibiting high decalin conversion in the hydrotreating layer preceding the dewaxing layer. Example 17 (Table 4) shows the maintenance of yield of lubricant oil when the catalyst in the hydrotreating layer has a low decalin conversion.

Example 19

A waxy hydrocrackate with an API of 34.8 with a wax content of 35% and a viscosity at 100° C. of 7.9 cst was dewaxed over a first reaction zone, a second reaction zone, and a third reaction zone. The hydrotreating catalyst in the first reaction zone was Catalyst D with a decalin conversion of 2.7%. The dewaxing catalyst in the second reaction zone was a bound noble metal zeolitic catalyst with 65% zeolite SSZ-32 bound with alumina and containing 0.325 wt. % Pt and promoted with magnesium. The hydrofinishing catalyst in the third reaction zone was Catalyst G. The process conditions were 2.0 LHSV based on the combined hydrotreating and dewaxing reaction zones, 4000 scf/bbl gas to oil ratio and 2300 psig total pressure; LHSV for the first zone was 6.7 and for the second was 2.4. The product target pour point was −16° C. which required the dewaxing zone to be maintained at 680° F. The reaction temperature for the hydrotreating reaction zone was kept the same as the temperature of the dewaxing zone, and the hydrofinishing reaction zone was maintained at 450° F. The yield of lubricant oil was 87.6%. Data is also presented at a similar product pour point in the absence of the first reaction zone, which requires a temperature of 665° F. and leads to a measured yield of 85%.

TABLE 6

|  | Example 20 | No guard layer (Ex 20 Comparative) |
|---|---|---|
| LHSV | 2.0 | 2.0 |
| Pressure (psig) | 2300 | 2300 |
| Temperature (° F.) (HDT/DW/HDF) | 680/680/450 | NA/665/450 |
| Pour point, ° C. | −16° | −16 |
| Wax Content Feed (%) | 35 | 35 |
| Lube Yield (%) | 87.6 | 85 |

From this example, it can be seen that the lube yield is maintained and even enhanced by the process of the invention, at temperatures of 680° F.

There are numerous variations on the present invention which are possible in light of the teachings and supporting examples described herein. It is therefore understood that within the scope of the following claims, the invention may be practiced otherwise than as specifically described or exemplified herein.

We claim:

1. A process for catalytically dewaxing a waxy hydrocarbon feedstock to yield a lubricant oil comprising the steps of: a) contacting a waxy hydrocarbon feedstock in a first reaction zone, under hydrotreating conditions in which the aromatics content of the feedstock is reduced, with a hydrotreating catalyst wherein the hydrotreating catalyst comprises a Group VIII metal supported on an inorganic oxide support, and wherein the hydrotreating catalyst exhibits a decalin conversion of less than 10% at 700° F., to form a first effluent; b) contacting at least a portion of the first effluent in a second reaction zone with a dewaxing catalyst under dewaxing conditions to yield a lubricant oil, wherein the lubricant oil has a pour point lower than the pour point of the first effluent, and wherein the yield of lubricant oil does not decrease more than 2%, at a target pour point, over a dewaxing temperature range; and c) contacting at least a portion of the lubricant oil with a hydrofinishing catalyst in a third reaction zone.

2. The process of claim 1, wherein the aromatic content of the feedstock is reduced by at least 20%.

3. The process of claim 1, wherein the aromatic content of the feedstock is reduced at least 30%.

4. The process of claim 1, wherein the dewaxing temperature range is from 450° F. to 750° F.

5. The process of claim 4, wherein the dewaxing temperature range is from 600° F. to 675° F.

6. The process of claim 1, wherein the dewaxing conditions and the hydrotreating conditions are the same.

7. The process of claim 1, wherein the target pour point is in the range from −10° C. to −45° C.

8. The process of claim 1, wherein the hydrotreating catalyst and the dewaxing catalyst are in the same reactor.

9. The process of claim 1, wherein the hydrotreating catalyst and the dewaxing catalyst are in a ratio of about 1:20 to about 1:2.

10. The process of claim 9, wherein the hydrotreating catalyst and the dewaxing catalyst are in a ratio of about 1:20 to about 1:10.

11. The process of claim 1, wherein the feedstock comprises less than about 10 ppm nitrogen.

12. The process of claim 1, wherein the feedstock comprises less than about 2 ppm nitrogen.

13. The process of claim 1, wherein the inorganic oxide comprises amorphous material.

14. The process of claim 13, wherein the inorganic oxide is selected from the group consisting of silica, alumina, titania, magnesia, zirconia, and combinations thereof.

15. The process of claim 1, wherein the inorganic oxide comprises crystalline material.

16. The process of claim 15, wherein the inorganic oxide is selected from the group consisting of silico-aluminophosphates, zeolites, metalloaluminophosphates, and combinations thereof.

17. The process of claim 1, wherein the Group VIII metal is platinum, palladium, or combinations thereof.

* * * * *